D. J. HARDING.
SHIPPING CRATE.
APPLICATION FILED MAR. 17, 1909.
926,941.
Patented July 6, 1909.
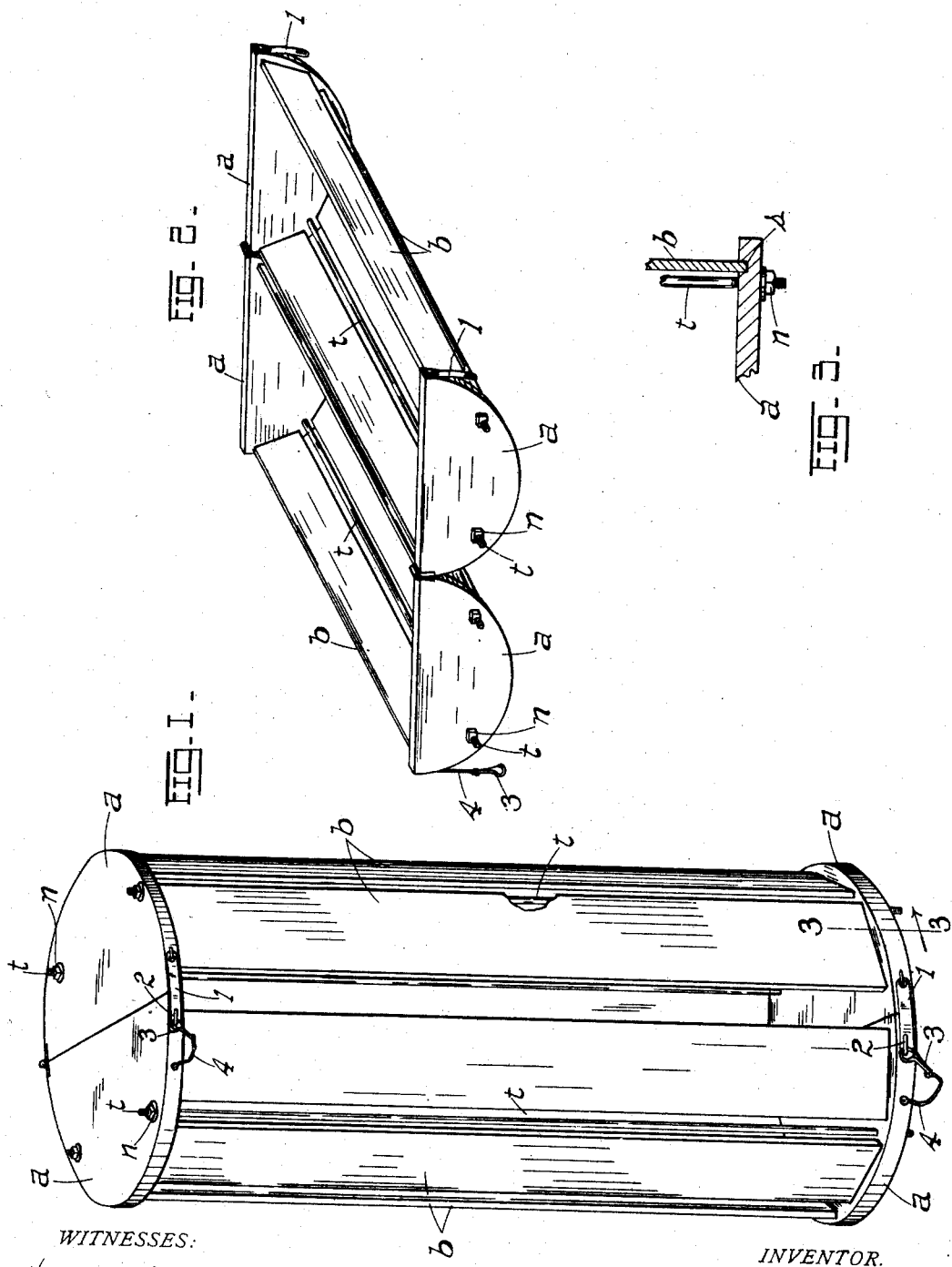
WITNESSES:
INVENTOR.
Daniel J. Harding.
BY
ATTORNEY.

UNITED STATES PATENT OFFICE.

DANIEL J. HARDING, OF NEW ORLEANS, LOUISIANA, ASSIGNOR OF ONE-HALF TO VICTOR CAMORS, OF NEW ORLEANS, LOUISIANA.

SHIPPING-CRATE.

No. 926,941.	Specification of Letters Patent.	Patented July 6, 1909.

Application filed March 17, 1909. Serial No. 483,959.

*To all whom it may concern:*

Be it known that I, DANIEL J. HARDING, citizen of the United States, residing at New Orleans, in the parish of Orleans and State of Louisiana, have invented certain new and useful Improvements in Shipping-Crates, of which the following is a full, clear, and exact description, reference being had to the accompanying drawings, forming a part hereof.
My invention has relation to improvements in shipping crates; and it consists in the construction and arrangements of parts more fully set forth in the specification and pointed out in the claim.
In the drawings, Figure 1 is a perspective of the crate assembled; Fig. 2 is a perspective of the same with parts assembled but shown in an open position; and Fig. 3 is a sectional detail on the line 3—3 of Fig. 1.
The object of my invention is to construct a knock-down crate primarily intended for shipping bananas though of course, not necessarily restricted thereto.

A further object is to provide a crate which shall be strong, durable, one affording the necessary ventilation to the fruit, one dispensing with the necessity of handling the fruit unduly, and one possessing further and other advantages better apparent from a detailed description of the invention which is as follows:—

Referring to the drawings, $a$, $a$, represents the sections of the terminal heads of the crate, said sections being hinged together and preferably semi-circular in form, thereby conjointly forming a circular head or end when closed. Along the inner face of each section, and adjacent to the curved edge thereof are formed depressions or sockets $s$ for the reception of the ends of the staves or slats $b$. In practice, the heads are first laid on the floor and opened out as shown in Fig. 2, whereupon there are passed through each pair of opposite sections and inside the circle defined by the slats, the tie-rods $t$, the projecting ends of the rods being screw-threaded and receiving the binding nuts $n$ as shown. The tie rods being in place, and with the nuts partly loosened the staves $b$ are inserted with their opposite ends into their respective sockets $s$, after which the nuts are driven firmly against the heads, thereby forcing the heads firmly against the staves, and the crate is then ready for use.

In the packing of the fruit, a certain quantity of straw is laid into one of the semi-cylindrical sections of the crate, then the fruit is laid on top of it, after which more straw is laid on the fruit and the opposite section closed over the fruit. The sections thus closed are locked by means of a latch 1 hinged to the edge of one of the head sections $a$ and passing over a staple 2 secured to the adjacent section $a$, after which the latch is locked by a snap hook 3 secured to a chain 4 carried by the section on which is disposed the staple 2.

While I have here shown a cylindrical crate, it is obvious that a prismatic form will answer the same purpose, although the cylindrical shape is the best for the present purpose. By the present system the old method of shipping bananas in sacks is dispensed with, the latter method being objectionable on account of the danger of bruising and mashing the fruit. Of course, the present crate is intended for use by small shippers who send the fruit to retailers who are not in position to keep a large stock on hand. The crate may be readily knocked down or disassembled by loosening the nuts $n$, pulling out the rods $t$ and packing the staves together.

Having described my invention, what I claim is:—

A shipping crate comprising head sections hinged in pairs at opposite ends of the crate and provided with series of depressions or grooves along their inner faces, connecting peripheral slats having their ends embedded in the grooves, tie-rods connecting the head sections and passed through the crate at points interiorly to the points of disposition of the slats, and means for locking the free ends of the respective pairs of hinged head sections together.

In testimony whereof I affix my signature, in presence of two witnesses.

DANIEL J. HARDING.

Witnesses:
EMIL STAREK,
JOS. A. MICHEL.